United States Patent [19]

Shelley

[11] Patent Number: 4,654,868
[45] Date of Patent: Mar. 31, 1987

[54] TIME INDEPENDENT DATA TRANSMISSION SYSTEM HAVING CAPABILITY FOR ACCESSING A PLURALITY OF DATA DEVICES

[76] Inventor: Edwin F. Shelley, 339 Oxford Rd., New Rochelle, N.Y. 10804

[21] Appl. No.: 805,314

[22] Filed: Dec. 5, 1985

Related U.S. Application Data

[63] Continuation-in-part of Ser. No. 643,450, Aug. 23, 1984, Pat. No. 4,578,534.

[51] Int. Cl.[4] .................................. H04M 11/00
[52] U.S. Cl. .................................. 379/106; 379/107
[58] Field of Search ............... 179/2 A, 2 AM, 2 R

[56] References Cited

U.S. PATENT DOCUMENTS 4,180,709 12/1979 Cosgrove et al. .............. 179/2 AM
4,504,831 3/1985 Jahr et al. ..................... 179/2 AM Primary Examiner—Gene Z. Rubinson
Assistant Examiner—David R. Schuster
Attorney, Agent, or Firm—Kenyon & Kenyon

[57] ABSTRACT

A time independent data transmission system which allows a computer to access a selected one of a plurality of data devices at a location remote from the computer at any time via a non-dedicated telephone line is disclosed. The system is coupled to a telephone instrument, the plurality of data devices and the telephone transmission line and normally connects a data set coupled to the data devices to the telephone transmission line. The telephone instrument is normally disconnected. A counting circuit senses the number of ring bursts in a ringing signal from a caller and a central computer is programmed to transmit a ringing signal having only one ring burst. When only one ring burst is sensed, the data set remains connected to the telephone transmission line and the data set dials up the central computer when the ringing signal terminates. The data set comprises a decoder circuit which receives a coded signal from the central computer designating which of the data devices is to be accessed. The decoder controls a switch to select one of the data devices. If more than one ring burst occurs, a non-computer call is being sensed and the data set is disconnected and the telephone connected to the telephone transmission line so that normal telephone usage is allowed. Communication between the computer and the data set via the telephone line occurs without ringing the telephone instrument and without otherwise interfering with normal telephone usage.

22 Claims, 3 Drawing Figures

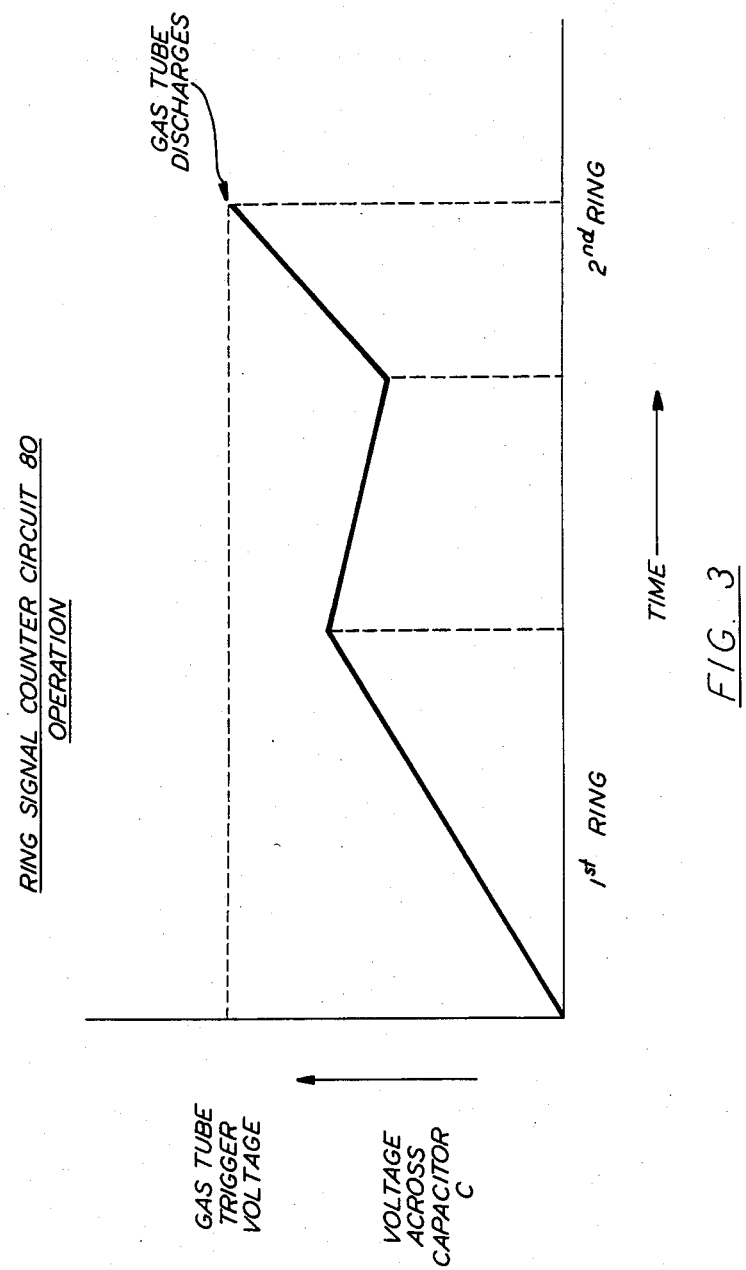

TIME INDEPENDENT DATA TRANSMISSION SYSTEM HAVING CAPABILITY FOR ACCESSING A PLURALITY OF DATA DEVICES

CROSS-REFERENCE TO RELATED APPLICATIONS

This application for patent is a continuation in part of prior copending application U.S. Ser. No. 643,450, now U.S. Pat. No. 4,578,534 entitled TIME INDEPENDENT DATA TRANSMISSION SYSTEM, filed Aug. 23, 1984, the disclosure of which is hereby incorporated by reference.

BACKGROUND OF THE INVENTION

1. Field of the Invention

The present invention relates generally to telephone data transmission systems, and more particularly to a time independent data transmission system which allows a central computer, for example, to access at any time, any one of a plurality of remote data transmitting devices, such as electronic publication storage devices, hybrid telephone-cable television polling systems, computer data base subscribers, data sets, or a plurality of utility or consumption meters, via nondedicated telephone lines and which enables communication with the data devices without interfering with normal use of the subscriber's telephone. The present invention finds application in many areas, one of which, for instance, might be a shop by computer system where it might be necessary to transmit information to and from a plurality of data devices connected to information storage devices. Another might be the field of power demand data retrieval, wherein a central computer has a capability of accessing a plurality of remote data devices which have stored therein data corresponding to the usage level of, for example, electrical power, water usage, or gas usage at the remote location. Still another might be remote control of heating, ventilating and air-conditioning equipment through telephone lines. Although the invention will be described for use with telephone lines, it will be apparent to one skilled in the art that the invention can also be used with transmission media other than telephone lines.

2. Description of the Prior Art

Various systems are presently known which allow central computers to access individual subscriber's data sets via non-dedicated telephone lines. For example, see U.S. Pat. Nos. 4,126,762, 4,104,486, 4,394,540, 4,345,113 and 4,469,917. In the '486 and '540 patents, the telephone is isolated from the telephone line during a selected time window. In the '762 patent, in one embodiment a time window is utilized. In another embodiment, sequential ringing signals having a different time spacing than signals from a normal telephone call condition the remote terminal to intercept the ringing signals and to provide selective connection of a data accumulator to the telephone line. It is preferable to use the subscriber's existing telephone line rather than install a separate dedicated line to provide access to the data set. Thus, systems of this type require that the telephone line be available for both use by ordinary persons and by computers calling the subscriber. Requirements of systems of this type are that when computer calls are received the call is coupled with or automatically transferred to a data set and the telephone preferably should not ring.

In applicant's prior U.S. Pat. No. 4,345,113, an automatic telephone message interception system is described which permits the use of a single telephone line for both ordinary personal use and for receiving calls from a computer, wherein computer calls are automatically transferred to the subscriber's data set without ringing the subscriber's telephone. An ordinary non-computer call made to the subscriber, would, however, be answered by the automatic telephone message interception system described in this U.S. Patent even if no one were present at the subscriber's telephone. The caller would thus be charged for a brief call even though no one answered the phone.

The subscriber could, of course, solve this problem by shutting off the automatic system if the telephone is to be left unattended, but the data set could not be accessed by the computer while the sytem was shut off.

The need thus existed for a system which both allows a central computer to access the subscriber's data set via a non-dedicated telephone line and which allows normal operation of the telephone by both the subscriber and other persons calling the subscriber. In particular, such a system should allow a computer to access the subscriber's data set without ringing the subscriber's telephone and should allow persons to call the subscriber at any time without being charged for the call if the telephone is unanswered.

In applicant's prior U.S. Pat. No. 4,469,917, a system and apparatus is described which satisfies the above need. In that patent, however, a system and apparatus is described for connecting a central computer to a remote subscriber's data set using the subscriber's non-dedicated telephone line during a preselected window in time. In applicant's copending application Ser. No. 643,450, the apparatus described in U.S. Pat. No. 4,469,917 has been modified to permit connection of the central computer at any time to a remote subscriber's data set using the subscriber's non-dedicated telephone line and without interference of any sort with the normal use of the subscriber's telephone. In the system described in U.S. Pat. No. 4,469,917, the apparatus detects a ringing signal on the telephone line during a preselected window in time during which the subscriber's data set is connected to the telephone line and the subscriber's telephone is disconnected. The apparatus does nothing until the ringing signal stops, indicating that the caller has hung up. The apparatus then causes the data set to dial up the central computer and proceed to transmit or receive data during the time window.

In U.S. patent application Ser. No. 643,450, a system which allows a central computer to access a subscriber's data set via non-dedicated telephone lines at any time, i.e., without limitation to a time window, is described. This system allows normal operation of the telephone by the subscriber without interference in any way with the subscriber use of the telephone at any time, i.e., the subscriber's telephone does not ring when the central computer calls, the subscriber is allowed to use the telephone even if data transmission with the computer is occurring and outside callers are not charged for calls when the phone is unanswered.

The apparatus described in U.S. patent application Ser. No. 643,450, however, must be modified in order to allow its use in applications where more than one data sending or receiving device is located at the remote location. For example, in a preferred application of the present invention, a plurality of consumption level devices are to be interrogated at the remote location by a central computer. The device described in U.S. Ser. No.

643,450 must be modified in order to allow the central computer to read signals from the proper data device, which might be, for example, a selected one of electric, water and gas utility meters. In the device described in Ser. No. 643,450, the telephone instrument is normally disconnected from the telephone line. The central computer issues a ringing signal having a single ring burst, and the device described in that patent application detects the single ring burst and triggers a data set to provide data over the telephone line to the central computer. If a ringing signal with more than one ring burst is detected, then the device recognizes that the call is not from the central computer and disconnects the data set from the telephone line and connects the telephone instrument to the telephone line, enabling the user to answer the call. Because the telephone was disconnected if a ringing signal with only one ring burst is detected, the telephone subscriber never hears a call from the central computer.

The device described in U.S. Ser. No. 643,450 provides a very advantageous solution to the problem of accessing a remote data set. However, since the central computer in that application only transmits a single ringing signal, and the data set is triggered by the device to transmit data in response to the ringing signal having the single ring burst, the system does not provide means for accommodating a remote location at which more than one data device, for example, a plurality of consumption meters, are disposed, since no means are provided for accessing the data from a particular one of the data devices or consumption meters.

Accordingly, the need exists for a data transmission system which allows a central computer to access any one of a plurality of data devices disposed at the remote location.

SUMMARY OF THE INVENTION

It is therefore an object of the present invention to provide an improved automatic data transmission system which allows a central computer to access a plurality of data devices located at a remote location at any time.

It is a further object of the invention to provide an automatic data transmission system which allows normal use of the subscriber's telephone by the subscriber at all times.

Another object of the invention is to provide an automatic data transmission system in which a central computer may access a plurality of data devices located at the subscriber remote location without disturbing the subscriber in any way.

A still further object of the invention is to prevent persons calling the subscriber from being charged for the call when the telephone is not answered by the subscriber.

A yet further object of the present invention is to provide a data transmission system which automatically transfers calls from human callers to the telephone instrument, allowing the telephone to ring, and which prevents the calls from a computer from ringing the telephone.

A still further object of the present invention is to provide a data transmission system which allows a central computer to access any one of a plurality of data devices located at the subscriber remote location, and which allows the data from the selected device to be received by the central computer.

These and other objects of the present invention are achieved by an apparatus coupling a plurality of data devices and a telephone instrument at a first location to a telephone transmission line so as to enable the communication of data between a selected one of the data devices at the first location and a second location without interfering with normal use of the telephone instrument, comprising first means coupled to each of the data devices for selecting one of the data devices in response to a code signal transmitted over the telephone transmission line, second means, coupled to the telephone transmission line, the telephone instrument and the first means and normally connecting the first means to the telephone transmission line, for disconnecting the first means from the telephone transmission line and connecting the telephone instrument to the telephone transmission line in response to any of selected ones of a plurality of first electrical signals transmitted on the telephone transmission line, the first signals each being indicative of a call from a caller on the telephone transmission line, the second means preventing disconnection of the first means in response to a selected one of the first signals, third means, coupled to the telephone transmission line and the first means, for detecting any of the first electrical signals transmitted on the telephone transmission line without answering the call and for generating a second electrical signal when any of the first electrical signals on the telephone transmission line has terminated, indicating that the caller has hung up, the selected data device being adapted to communicate data via the first means and the second means in response to the generation of the second electrical signal after the selected one of the first electrical signals has terminated.

A method for providing communication between a data set at a first location and a second location over a telephone transmission line is also within the scope of the invention.

Other objects, features, and advantages of the present invention will be apparent from the description which follows.

BRIEF DESCRIPTION OF THE DRAWINGS

The invention will be described in greater detail in the following description with reference to the drawing figures in which:

FIG. 3 illustrates graphically the operation of part of the apparatus shown in FIGS. 1 and 2 and described in U.S. application Ser. No. 643,450.

DETAILED DESCRIPTION

Figure 1:
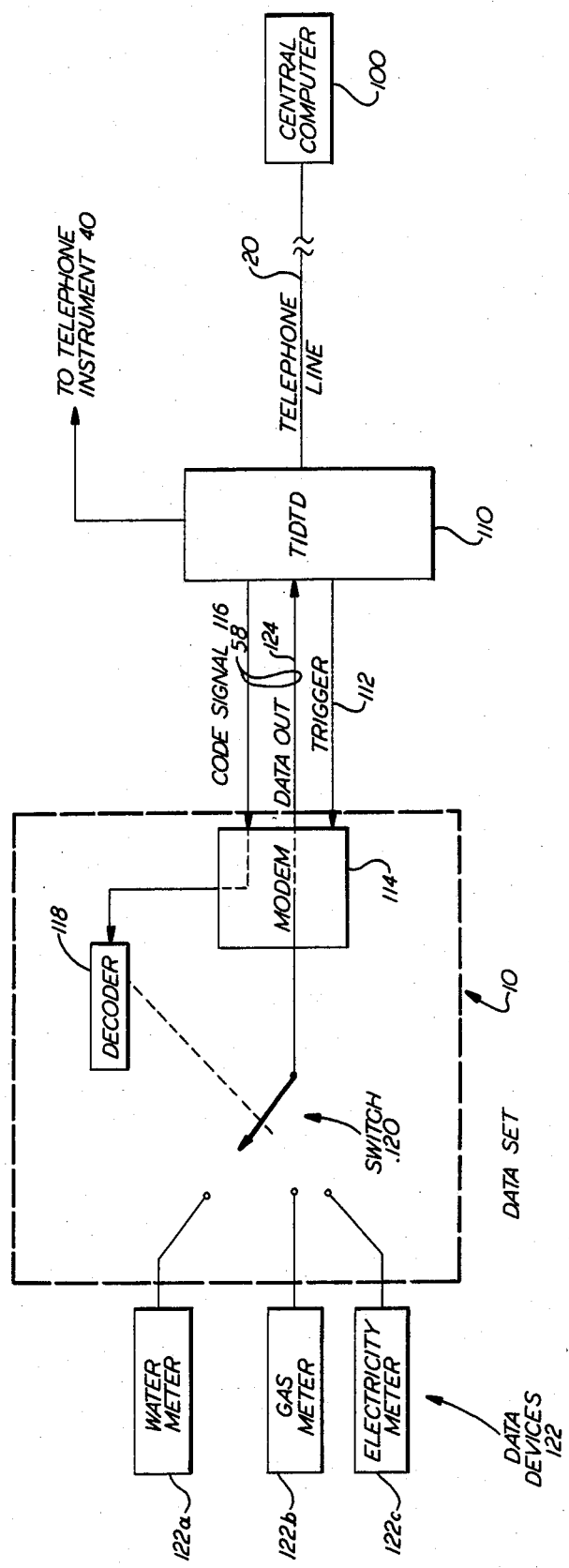
FIG. 1 is an overall block diagram of one embodiment of the present invention.

With reference now to the drawings, a system which allows a central computer to access any one of a plurality of data devices located at a remote or first location is shown in FIG. 1. A central computer 100 at a second location may access a data set 10 located at the subscriber remote location at any time through each subscriber's telephone line, indicated by reference numeral 20. A central computer is preferably programmed to provide only one ringing signal or ring burst over the telephone transmission line, although, two or three rings could probably be used, since very few human callers only allow two or three rings before hanging up. In the preferred embodiment, if only one ringing signal is detected, the subscriber's data set will be triggered to dial up the central computer and communicate with the computer. Two-way communication is contemplated, i.e., the data set may, for example, both receive data from the computer and transmit data to the computer. Additionally, the subscriber may regain use of the telephone instrument during data transmission simply by lifting the telephone receiver.

The block shown by reference numeral 110 in FIG. 1 preferably comprises a time independent data transmission device (TIDTD) shown in application Ser. No. 643,450, and which will be explained in more detail below for purposes of reference. The central computer 100 transmits a ringing signal having one ring burst over telephone line 20 to TIDTD 110. The subscriber's telephone instrument 40 is also coupled to TIDTD 110. As will be explained in greater detail below, if only a single ring burst is detected, the TIDTD 110 transmits a trigger signal 112 to a data set 10, which includes a modulator/demodulator device (modem) 114, as is well known to those skilled in the art of telecommunications. In response to trigger signal 112, modem 114 calls the central computer 100 generally via an automatic dial up routine, through the TIDTD 110. In response to the dial up routine, central computer 100 sends a coded signal over the telephone lines 20 to the TIDTD 110, which transmits the coded signal 116 via line 58 to the modem 114. The coded signal 116 is received by modem 114 and forwarded to a decoder 118, which can comprise any one of a number of decoding devices, as will be apparent to one of skill in the art. Decoder 118 controls a switch 120, which selects the proper data device 122, which, for example, may comprise a water meter 122a, a gas meter 122b and an electricity meter 122c. The reading stored or present in the data device 122 is then transmitted by modem 114 over lines 58 as signal 124 to TIDTD 110 and then to the central computer 100 over telephone lines 20. In an embodiment of the device, signals 116 and 124 are transmitted over the same transmission line or lines 58, meaning that two-way transmission occurs over these lines. This will be shown in more detail in FIG. 2.

As shown by the apparatus illustrated in FIG. 1, central computer 100 may access a plurality of data devices at the subscriber remote location by sending only a ringing signal having a single ring burst, which triggers modem 114 via TIDTD 110, and a code signal, which is transmitted to decoder 118 for selecting the selected one of the data devices 122. Data devices 122 can either automatically transmit their data via modem 114 to the central computer, or the central computer can transmit a further signal to trigger the particular data device to transmit its reading via the modem 114 and TIDTD 110 to the central computer. Thus, a central computer can selectively read any of a multiplicity of data devices at a given location by using the apparatus shown.

Although a mechanical switch 120 is shown as part of the data set 10 in FIG. 1 for purposes of clarity, a solid state switch could be used. Furthermore, decoder 118 is preferably a solid state device, as well known to those skilled in the art.

As shown in FIG. 1, data devices 122 may comprise a plurality of consumption meters. If the meter readings from different ones of the meters are required by correspondingly different utilities, the central computer may relay the appropriate readings to the appropriate utilities by electrical or other means. Alternatively, the central computer could provide a service to print out and process all the appropriate bills to the appropriate customers of the several utilities subscribing to the central computer billing service.

The TIDTD 110 shown in FIG. 1 is described in applicant's copending application Ser. No. 643,450, as mentioned above. For the purposes of ease of reference, that device will be described in detail below.

Figure 2:
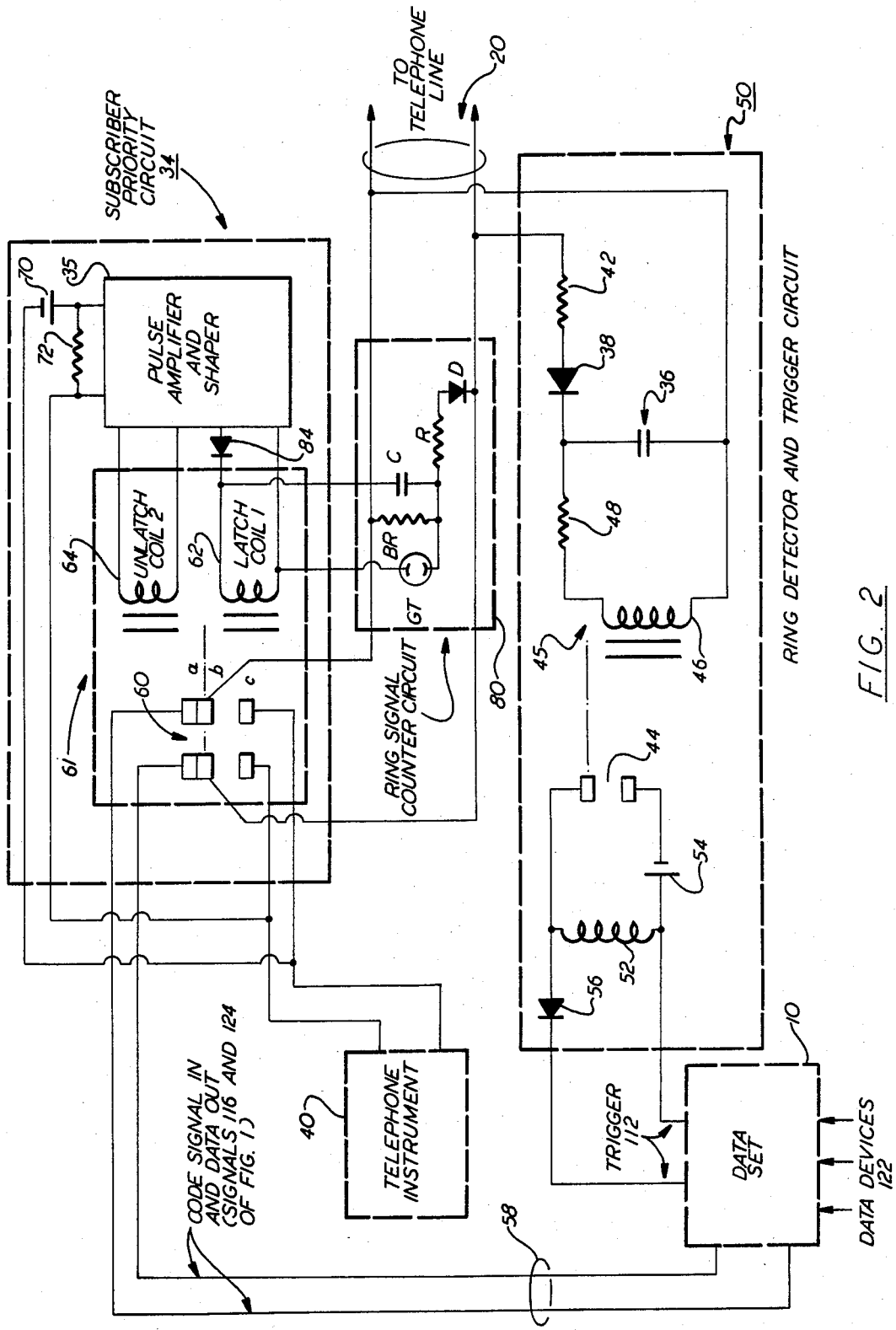
FIG. 2 is a schematic diagram of one embodiment of the present invention showing details of the time independent data transmission device described in applicant's copending U.S. application Ser. No. 643,450 and which forms a part of this invention.

With reference to FIG. 2, data set 10, shown in more detail in FIG. 1, is normally connected to the telephone lines 20 through a first dual set of contacts 60 (a and b) of a relay 61. A ring signal counting circuit 80 is coupled to the telephone line 20 as shown. If counter circuit 80 detects the commencement of a second ring burst, it triggers the latch coil 62 of relay 61 and thus connects the subscriber's telephone instrument 40 to the telephone line by allowing b and c of contacts 60 to make. The data set is thus disconnected. The subscriber's telephone instrument then proceeds to ring and can be used normally. If a second ring burst does not follow the first ring burst, the data set remains connected to the telephone line and is caused to dial up the central computer, as described in more detail below. Ring signal counter circuit 80 resets itself after each call. After any use of the telephone instrument has been completed, the data set is once more connected to the telephone line by the relay 61 which has been unlatched by the operation of the subscriber priority circuit 34, to be described in more detail below. Thus, for selected ones of the ringing signals having more than one ring burst, the data set is disconnected and the telephone instrument connected. For a selected one of the ringing signals, i.e., preferably a ringing signal having only one ring burst, the data set remains connected and the telephone disconnected.

The ring signal counter circuit 80 essentially may be an RC circuit disposed across the telephone line as shown in FIG. 2 comprising resistor R, capacitor C, diode D, resistor BR and gas discharge tube GT. The time constant is chosen to charge the capacitor C through resistor R and diode rectifier D to approximately one-half of the ring signal voltage on the first ring and to a higher voltage on the second ring as shown in FIG. 3. The higher voltage is sufficient to trigger a gas discharge tube GT in series with the latch coil 62 of relay 61, thus energizing the latch coil and connecting the telephone instrument to the telephone line while disconnecting the data set from the telephone line. A diode 84 is placed between the pulse amplifier and shaper 35, to be described below, and the latch coil 62, to prevent pulses from the circuit 80 from feeding back into circuit 35. A high resistance bleeder resistor BR discharges the capacitors slowly after each single ring call from the central computer. Other types of counting circuits could obviously be used for this purpose. For example, the gas discharge tube GT could be replaced by semiconductor devices, e.g., a threshold sensitive zener diode in series with a resistor coupled across the resistor BR, the junction of the zener diode and the resistor being coupled to the base of a switching transistor having its emitter-collector path in series with latch coil 62. Furthermore, other circuits could be used, such as filter circuits and appropriate digital logic counters.

The device shown in FIG. 2 further includes a ring detector and trigger circuit 50, the operation of which will now be explained. When the central computer calls, or if anyone else calls, the ring signal on the telephone line will charge capacitor 36 through rectifying diode 38 and isolating resistor 42. Contacts 44 operated by relay coil 46 of relay 45 will therefore close once relay coil 46 is energized. Resistor 48 and capacitor 36 have a time constant chosen so that capacitor 36 remains sufficiently charged between successive rings of the same call and coil 46 remains energized. When the caller hangs up and the ringing stops, capacitor 36 will slowly discharge through resistor 48 and coil 46 until relay 45 becomes deenergized, opening contacts 44. A voltage source 54 and an inductor 52 in series are disposed across contacts 44. When contacts 44 open a voltage pulse is induced across inductor 52. This pulse is coupled through diode 56 to the data set 10 to trigger the data set's dial up function. Diode 56 insures that only pulses of the proper polarity are coupled to the data set. Thus, the opposite pulse induced across inductor 52 when contacts 44 close will not be coupled to the data set. Data set 10 can then dial up the central computer, as explained above, through output lines 58 which are used both for dial up routines and for data transmission and through dual pairs of contacts a and b of contact 60 of relay 61 controlled by relay coils 62 and 64. The operation of relay coils 62 and 64 will be described in more detail later with reference to the subscriber priority circuit 34. At the time that the data set initiates a dial up routine and when the telephone set is down, the pairs of contacts a and b of contacts 60 will remain made so long as the central computer called (only one ring signal detected by ring signal counter circuit 80), so that the data set output lines are connected to the telephone line 20 and the central computer can be dialed up and communication between data set and computer can occur. Once the central computer has been dialed up, as explained above, preferably central computer 100 transmits a code signal over the telephone lines 20 to contacts 60 b and a, through lines 58 to the data set 10. Decoder 118 then selects the proper data device 122, according to the code signal 116, via switch 120. The appropriate data device 122, either automatically or by a trigger signal from the central computer 100, then transmits its stored coded information to modem 114, which transmits the stored data signal over lines 58 through contacts 60 a and b to the telephone lines 20.

The embodiment of ring detector and trigger circuit 50 shown in FIG. 2 is only one form of the circuit. Relay 45 could be replaced by a switching transistor, for example, and the inductor 52 and related circuitry could be replaced by a single shot or monostable multivibrator triggered to output a pulse when the switching transistor is biased off when the ringing signal terminates.

Should a non-computer call (i.e., more than one ring signal) be received, data set 10 will attempt to dial up the computer even though the computer did not call. Because, however, contact pairs a and b of relay contacts 60 have opened, no such dial up signal will be transmitted to the computer. Should a single ring signal be received which was not generated by the central computer, the central computer can be programmed so that it would ignore the return call because it did not call the data set.

Data devices 122 may comprise any of several commercially available devices. For example, water meter 122 may comprise any of commercially available meters and meter encoding devices which translate the meter readings into suitable electrical signals.

The subscriber priority circuit 34 mentioned earlier is designed to reconnect the telephone instrument 40 to the telephone line 20 when it is normally disconnected if the subscriber lifts the telephone handset to use the phone. Normally, the telephone instrument is disconnected from the telephone line 20 by contacts 60, which also form a part of circuit 34. The telephone, however, is also connected to the pulse amplifier and shaper 35 of subscriber priority circuit 34 via voltage source 70 and resistor 72. The impedance looking into resistor 72 and source 70 is chosen so that it does not interfere with normal telephone use. When the telephone handset is lifted, a voltage pulse of a particular polarity appears across resistor 72. This pulse energizes latch coil 62 of relay 61 through pulse amplifier and shaper 35 and connects the telephone instrument through contacts b and c of contacts 60 of relay 61 to the telephone line 20, while disconnecting the data set 10 from the telephone line by opening normally closed contacts a and b of contact 60 of relay 61. When the subscriber replaces the telephone handset ("hangs up"), a pulse of opposite polarity to the previous pulse energizes unlatch coil 64 of relay 61 and opens contacts b and c and closes contacts a and b, thus reconnecting the data set to the telephone line and disconnecting the telephone instrument from the telephone line. The pulse amplifier and shaper circuit therefore performs a dual function of shaping the pulse at its input and discriminating between positive and negative pulses so as to energize the proper relay coil 62 or 64. Pulse amplifier and shaper 35 may take the form of various circuits known in the art.

Although the invention as shown in the drawing figures indicates discrete components, and schematically indicates some electromechanical relays and switches, it is clear that the system can be constructed utilizing discrete semiconductor devices or embodied in a solid state integrated circuit produced on a silicon or a similar chip. For example, the function of the electromechanical relays which are schematically indicated in the figure could be performed by switching transistors. Furthermore, as is well known, modem 114, decoder device 118 and switch 120, which comprise data set 10, all may comprise solid state devices.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus coupling a plurality of data devices and a telephone instrument at a first location to a telephone transmission line so as to enable the communication of data between a selected one of the data devices at the first location and a second location without interfering with normal use of the telephone instrument, comprising:

first means coupled to each of said data devices for selecting one of said data devices in response to a code signal transmitted over said telephone transmission line;

second means, coupled to said telephone transmission line, said telephone instrument and said first means and normally connecting said first means to said telephone transmission line, for disconnecting said first means from said telephone transmission line connecting said telephone instrument to said telephone transmission line in response to any of selected ones of a plurality of first electrical signals transmitted on said telephone transmission line, said first signals each being indicative of a call from a caller on said telephone transmission line, said second means preventing disconnection of said first means in response to a selected one of said first signals;

third means, coupled to said telephone transmission line and said first means, for detecting any of said first electrical signals transmitted on said telephone transmission line without answering the call and for generating a second electrical signal when any of the first electrical signals on said telephone transmission line has terminated, indicating that the caller has hung up;

said selected data device being adapted to communicate data via said first means and said second means in response to the generation of said second electrical signal after said selected one of said first electrical signals has terminated.

2. The apparatus recited in claim 1 wherein said first means comprises:

communication means for receiving said second electrical signal and for communicating with said second location in response to the generation of said second electrical signal;

means for receiving said code signal from said second location;

means for decoding said code signal coupled to said means for receiving said code signal; and switch means coupled to said decoding means for switching between selected ones of said data devices in response to said code signal and for coupling the selected one of the data devices to said communication means.

3. The apparatus recited in claim 2 wherein said communication means comprises a modem.

4. The apparatus recited in claim 1, further comprising fourth means coupled to said first means, said telephone instrument and said telephone transmission line, for connecting said telephone instrument to said telephone transmission line and disconnecting said data set from said telephone transmission line in response to a first electrical signal generated by said telephone instrument, and for disconnecting said telephone instrument from said telephone transmission line and reconnecting said data set to said telephone transmission line in response to a second electrical signal generated by said telephone instrument.

5. The apparatus recited in claim 4 wherein said second means comprises switching means coupled to said telephone instrument, said telephone transmission line and said first means and normally connecting said first means to said telephone transmission line.

6. The apparatus recited in claim 1 wherein each of said plurality of first electrical signals transmitted on said telephone transmission line comprises a ringing signal having a varying number of ring bursts, and wherein said third means generates said second electrical signal when the transmission of said ringing signal on said telephone transmission line terminates.

7. The apparatus recited in claim 6 wherein said selected one of said first electrical signals is a ringing signal having a single ring burst, said second means preventing disconnection of said first means when said ringing signal having a single ring burst is detected.

8. The apparatus recited in claim 5 wherein said first electrical signals each comprise ringing signals having a varying number of ring bursts and said second means further comprises counting means for sensing the number of ring bursts in said first electrical signals and for preventing disconnection of said data set from said telephone transmission line if the number of ring bursts is one and for disconnecting said data set from the telephone transmission line if the number of ring bursts is greater than one.

9. The apparatus recited in claim 5 wherein said fourth means includes said switching means normally connecting said telephone transmission line to said first means, and circuit means, coupled to said switching means and said telephone instrument, for generating first and second electrical signals and being responsive to said first and second signals generated by said telephone instrument, said switching means being responsive to said first and second electrical signals generated by said circuit means and disconnecting said first means from said telephone transmission line and connecting said telephone instrument to said telephone transmission line in response to said first signal generated by said circuit means and connecting said data set to said telephone transmission line and disconnecting said telephone instrument from said telephone transmission line in response to said second signal generated by said circuit means.

10. The apparatus recited in claim 9 wherein said first signal generated by said telephone instrument is generated when the telephone receiver is lifted, and said second signal generated by said telephone instrument is generated when the telephone receiver is replaced.

11. The apparatus recited in claim 10 wherein said first and second signals generated by said telephone instrument comprise pulse signals of opposite polarity and said circuit means includes pulse discrimination means for discriminating between said pulse signals generated by said telephone instrument.

12. The apparatus recited in claim 2 wherein said data devices comprise consumption meter means having electrical outputs, each of said consumption meter means being responsive to a selected one of physical measured quantities.

13. The apparatus recited in claim 12 wherein said data devices comprise selected ones of gas, electricity and water usage meters.

14. The apparatus recited in claim 1 wherein a central computer is located at said second location.

15. A method of providing communication of data between a data set at a first location and a second location over a telephone transmission line without interfering with normal use of a telephone instrument coupled to the line, comprising the steps of:

disconnecting said data set from said telephone transmission line and connecting said telephone instrument to said telephone transmission line in response to any of selected ones of a plurality of first electrical signals transmitted on said telephone transmission line, said first signals each being indicative of a call from a caller on said telephone transmission line;

preventing disconnection of said data set in response to a selected one of said first signals;

detecting any of said first electrical signals transmitted on said telephone transmission line without answering the call and generating a second electrical signal when any of the first electrical signals on said telephone transmission line has terminated, indicating that the caller has hung up;

said data set communicating data in response to the generation of said second electrical signal after said selected one of said first electrical signals has terminated.

16. The method recited in claim 15 wherein said data set is coupled to a plurality of data devices at the first location, and further comprising the steps of:

transmitting a code signal from said second location designating a selected one of said data devices; and selecting one of said data devices in response to the transmitted code signal thereby allowing communication of data between said selected data device and said remote location.

17. The method recited in claim 15, further comprising the steps of connecting said telephone instrument to said telephone transmission line and disconnecting said data set from said telephone transmission line in response to a first electrical signal generated by said telephone instrument, and disconnecting said telephone instrument from said telephone transmission line and reconnecting said data set to said telephone transmission line in response to a second electrical signal generated by said telephone instrument.

18. The method recited in claim 15 wherein each of said plurality of first electrical signals transmitted on said telephone transmission line comprises a ringing signal having a varying number of ring bursts, and said step of generating said second electrical signal comprises generating said second electrical signal when the transmission of said ringing signal on said telephone transmission line terminates.

19. The method recited in claim 18 wherein said selected one of said first electrical signals is a ringing signal having a single ring burst, and said step of preventing comprises preventing disconnection of said data set when said ringing signal having a single ring burst is detected.

20. The method recited in claim 18 wherein said first electrical signals each comprise ringing signals having a varying number of ring bursts and said steps of disconnecting and connecting comprises sensing the number of ring bursts in said first electrical signals and preventing disconnection of said data set from said telephone transmission line if the number of ring bursts is one and disconnecting said data set from the telephone transmission line if the number of ring bursts is greater than one.

21. The method recited in claim 17 wherein said first signal generated by said telephone instrument is generated when the telephone receiver is lifted, and said second signal generated by said telephone instrument is generated when the telephone receiver is replaced.

22. The method recited in claim 21 wherein said first and second signals generated by said telephone instrument comprise pulse signals of opposite polarity and further comprising the step of discriminating between said pulse signals generated by said telephone instrument.

* * * * *